United States Patent [19]

Tamura et al.

[11] Patent Number: 5,006,780
[45] Date of Patent: Apr. 9, 1991

[54] CHARGING CIRCUIT

[75] Inventors: Kozo Tamura; Toshiharu Kodato; Syoichi Nihira; Yasuhiro Tsukamoto; Akira Iida, all of Hitachi, Japan

[73] Assignees: Hitachi, Ltd., Tokyo; Tagasangyo, Ltd., Hitachi, both of Japan

[21] Appl. No.: 336,785

[22] Filed: Apr. 13, 1989

[30] Foreign Application Priority Data

Apr. 13, 1988 [JP] Japan .................................. 63-89084

[51] Int. Cl.⁵ ............................................. H02J 7/04
[52] U.S. Cl. ............................................. 320/54; 320/2; 320/28
[58] Field of Search ....................... 320/54, 56, 25, 26, 320/2, 28, 55

[56] References Cited

U.S. PATENT DOCUMENTS 3,389,324  6/1968  Ballman ........................ 320/54 X
3,419,779 12/1968  Zehner ......................... 320/54 X
3,457,491  7/1969  Black et al. ................... 320/54 X

FOREIGN PATENT DOCUMENTS 62-120829 of 1987 Japan .

Primary Examiner—R. J. Hickey
Attorney, Agent, or Firm—Antonelli, Terry, Stout & Kraus

[57] ABSTRACT

A charging circuit comprises a main circuit for charging a battery and a power unit connected to an electric power source. The main circuit and the power unit are connected through a connector to each other. The power source transformed by a transformer located at the power unit is supplied to the connector through a contact of a direct current relay. After alternating current is introduced to the main circuit from the power unit, the alternating current is rectified by a diode bridge. The direct current from the diode bridge is supplied to the battery through a control circuit. When the battery is charged sufficiently, the control circuit outputs an instruction signal to a diode portion of a photo-triac connected between an output terminal of the diode bridge and the control relay. When the instruction signal is transmitted to the diode portion, a triac portion of the photo-triac, which is connected between one of an input terminal of the diode bridge and the connector, outputs another instruction signal to the relay located at the power unit for opening the contact through the connector.

3 Claims, 4 Drawing Sheets

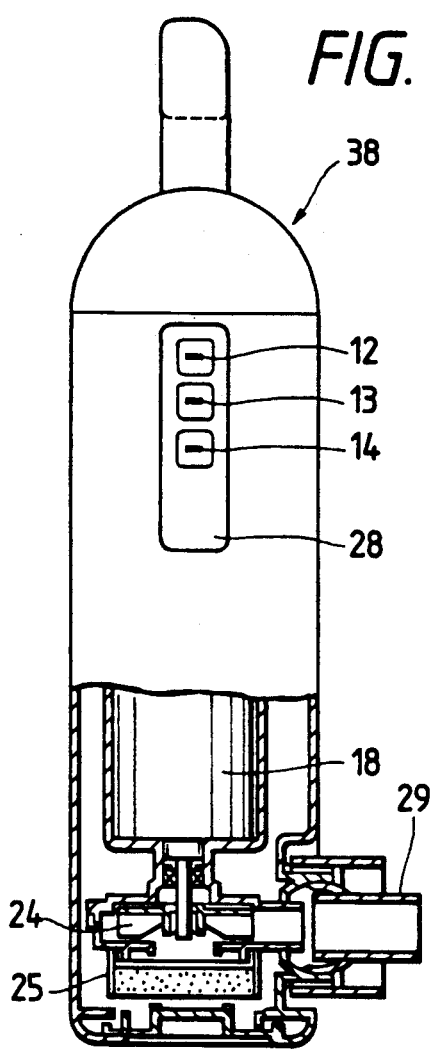
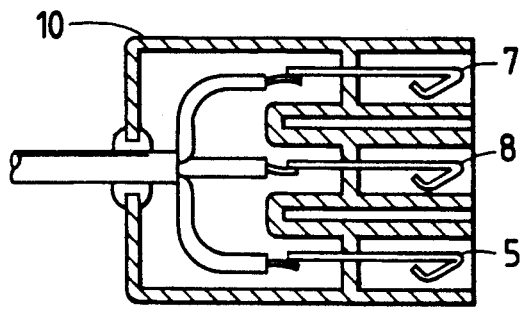
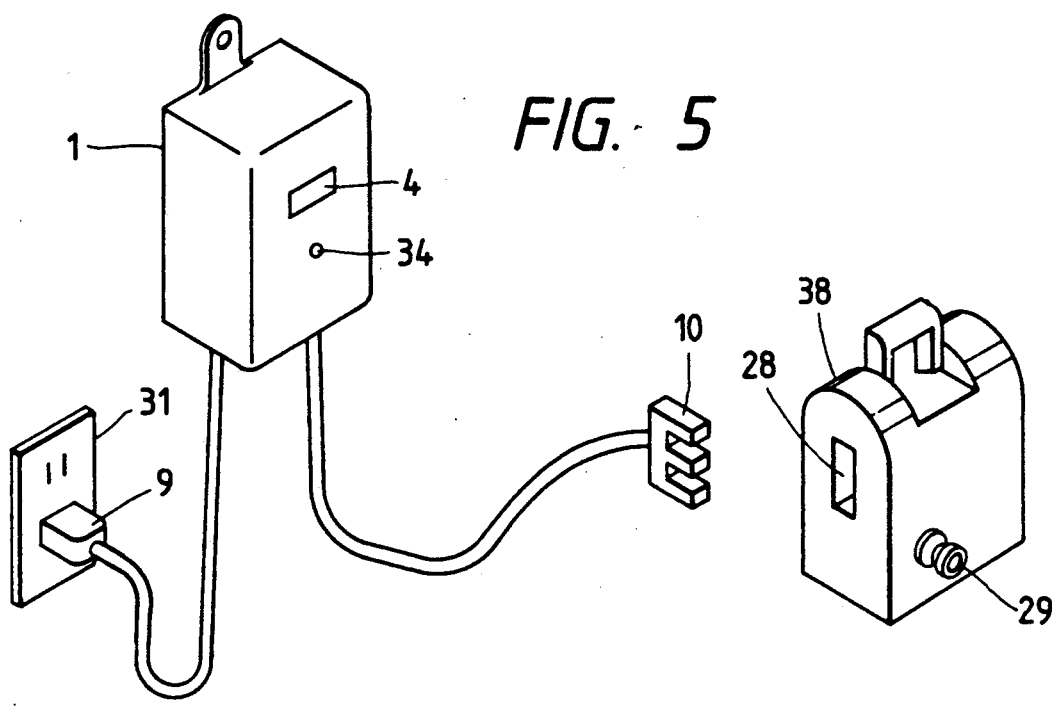

CHARGING CIRCUIT

FIELD OF THE INVENTION

The present invention relates to a charging circuit. More specifically, the present invention relates to a power unit which is suitable for a submergible apparatus using a battery.

BACKGROUND OF THE INVENTION

A prior apparatus in this field is disclosed, for instance, in FIG. 1 of Japanese Patent-Laid Open No. 62-120829 (1987) published on June 2, 1987 entitled "Charging apparatus for a small size vacuum cleaner", which equips a transformer for transforming a power-frequency voltage to a voltage which is necessary for charging a battery, the primary winding of the transformer is connected to the power-frequency voltage, and the secondary winding of the transformer is connected to the battery through a connecting terminal.

When the apparatus enclosing the battery of the prior art mentioned above finishes the charging of the battery or is not necessary to charge the battery, a reverse current from the battery to the charging circuit flows through the connecting terminal. For preventing such a leakage of the current to the battery, it is necessary to provide a relay contact which opens its contact for interrupting power supply from the electric power source to the battery when the charging of the battery does not take place. Accordingly, for attaining the above-mentioned demand, it is necessary to add a connecting portion of a signal wire for closing and opening the relay contact to the connector terminal. When a battery terminal connected to the connector terminal is made wet by water, the battery current flows in reverse so that unnecessary discharge and power consumption of the battery are caused and performance of the battery is not maintained.

SUMMARY OF THE INVENTION

An object of the present invention is to provide a charging circuit which is able to prevent a reverse flow of current from the battery to the connecting portion of the charging circuit as well as to the signal wire and maintain the performance of the battery.

According to the present invention, the current flowing through the connecting terminal located between a main circuit for charging battery and a power unit connected to the electric power source is made to be an alternating current as explained later so that an electric erosion does not occur at the connecting terminal when the connecting terminal is made wet by water. In the power unit of the present invention, a diode bridge is located between the connecting terminal for supplying the alternating current from the power unit and the battery, and an element comprising a photo-triac having a direct current portion connected between the battery and an output terminal of the diode bridge for transmitting the first instruction signal when the battery is finished charging and an alternating current portion connected between an input terminal of the diode and the connected terminal of the signal wire for transmitting the second instruction signal for opening a relay contact connected to the electric power source in accordance with the first instruction signal are provided. The direct current portion and the alternating current portion are not connected electrically and are able to open and close the alternating portion based on the first instruction signal. Since the relay contact is operated by the second instruction signal of the alternating current in accordance with the first instruction signal of the direct current, the reverse current from the battery is not flowed to the connecting terminal.

BRIEF DESCRIPTION OF THE DRAWINGS

FIG. 3 shows a side view of the bubble generating apparatus, FIG. 4 illustrates a sectional view of a connector, FIG. 5 shows an appearance for explaining an electrical connection of the bubble generating apparatus.

DETAILED DESCRIPTION OF THE PREFERRED EMBODIMENTS

Figure 1:
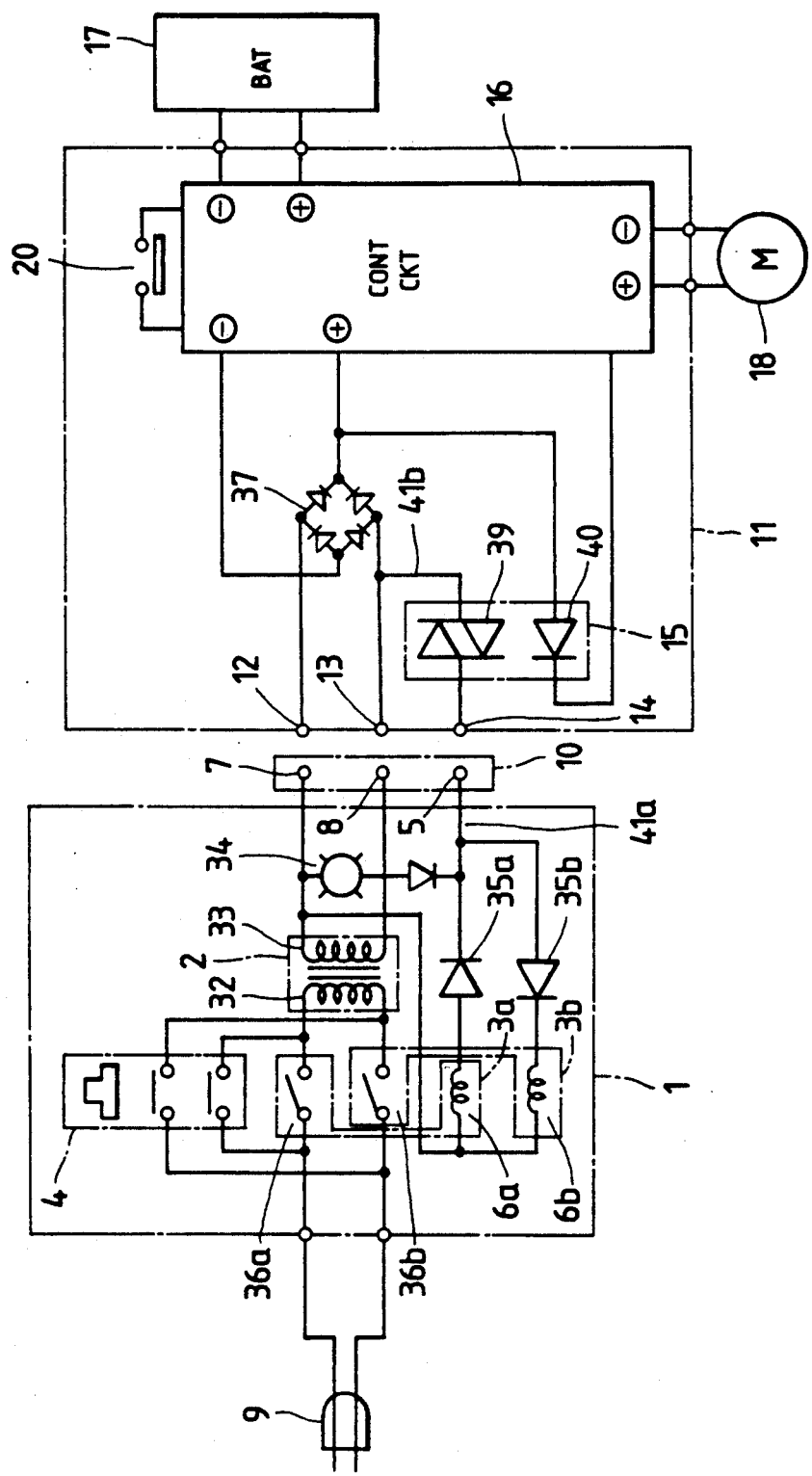
FIG. 1 shows one embodiment of a charging circuit applied to a bubble generating apparatus.

Referring to FIG. 1, the charging circuit of the present invention comprises the main circuit 11 for charging the battery 17 and the power unit 1 connected to the electric power unit. The main elements of the power unit 1 are the transformer 2, the relays 3a and 3b, diodes 35a and 35b, and a lamp 34. The primary winding of the transformer 2 is connected to a plug 9 through a switch 4, or contacts 36a and 36b of the relays 3a and 3b. For instance, an alternating current 100 V is supplied to the power unit 1 from a plug socket 3 as shown in FIG. 5. The secondary winding 33 of the transformer 2 is connected to the connecting terminals 7 and 8 of the connector 10. The first series circuit comprising the coil 6a of the relay 3a and the diode 35a, and the second series circuit comprising the coil 6b of the relay 3b and the diode 35b are connected between the connecting terminal 7 and the connecting terminal 5 of the connector 10. The flowing directions of currents of the first and second series circuits are inverse, since the diodes 35a and 35b are connected in antiparallel. The lamp 34 is connected between the connecting terminals 5 and 7. The contact 36a is closed by flowing current to the coil 6a. The contact 36b is closed by flowing current to the coil 6b. The coils 6a, 6b and the lamp 34 are flowed current simultaneously. The body 38 shown in FIGS. 3 and 5 encloses the main circuit 11, the battery 17 and the motor 18. The main circuit 11 comprises the photo-triac 15, the control circuit 16 for controlling the charging and discharging of the battery 17, the lead switch 20 connected to the control circuit 16, and the diode bridge 37 for supplying the direct current to the control circuit 16 when the battery 17 is charged. The connecting terminals 7 and 8 of the connector 10 and the connecting terminals 12 and 13 of the main circuit 11 are connected so as to able to provide the alternating current to the diode bridge 37. The connecting terminal 5 of the connector 10 and the connecting terminal 14 of the main circuit 11 are connected for controlling the current passing through the photo-triac 15. The battery 17 and the motor 18 are connected to the control circuit 11. The photo-triac 15 comprises a triac portion for controlling the current flowing through the signal wires 41a and 41b, and a diode portion 40 which closes the triac portion 39 when the diode portion 40 receives the instruction signal from the control circuit 16. The triac portion 39 and the diode portion 40 are insulated each other.

Hereunder, we will explain the function of charging and discharging of the charging circuit shown in FIG. 1. The plug 9 is connected to the plug socket 31 shown in FIG. 5, and the connector 10 is connected to the aperture 28 of the body 38 shown in FIG. 3. The aperture 28 has the connecting terminals 12, 13 and 14. When the switch 4 is turned ON, the primary winding 32 of the transformer 2 is flowed current, and the secondary winding 33 of the transformer 2 generates an alternating current 14 V so that the direct current is supplied to the control circuit 16 through the diode bridge 37. Next, the battery 17 is supplied charging current, at the same time, the diode portion 40 of the photo-triac 15 is flowed current, the triac portion 39 is closed, the coils 6a and 6b are energized, and the lamp 34 is lit. When the coils 6a and 6b are energized, the contacts 36a and 36b are closed. After that, when the switch 4 is opened, the charging of the battery is continued since the transformer 2 continues to flow current therethrough by the operation of the relays 3a and 3b. When the battery 17 is charged sufficiently, the control circuit 16 ceases to flow current to the photo-triac 15, the triac portion 39 is opened, the coils 6a, 6b and the lamp 34 are stopped to flow current, and the contacts 36a and 36b are opened so that the charging of the battery is completed.

The discharging of the battery 17 is carried out by closing the lead switch 20 to the motor 18 through the control circuit 16. After that, even if the lead switch is opened, the control circuit 16 continues to flow current to the motor until three minutes have lapsed after the closing of the lead switch 20. By closing the lead switch 20 before three minutes have lapsed after the first closing of the lead switch 20, the control circuit 16 stops to flow current, and the motor 18 is stopped. Since the control circuit 16 encloses a timer, when three minutes have passed after the motor was driven, the motor is stopped automatically even if the lead switch 20 is not closed after that.

Figure 6:
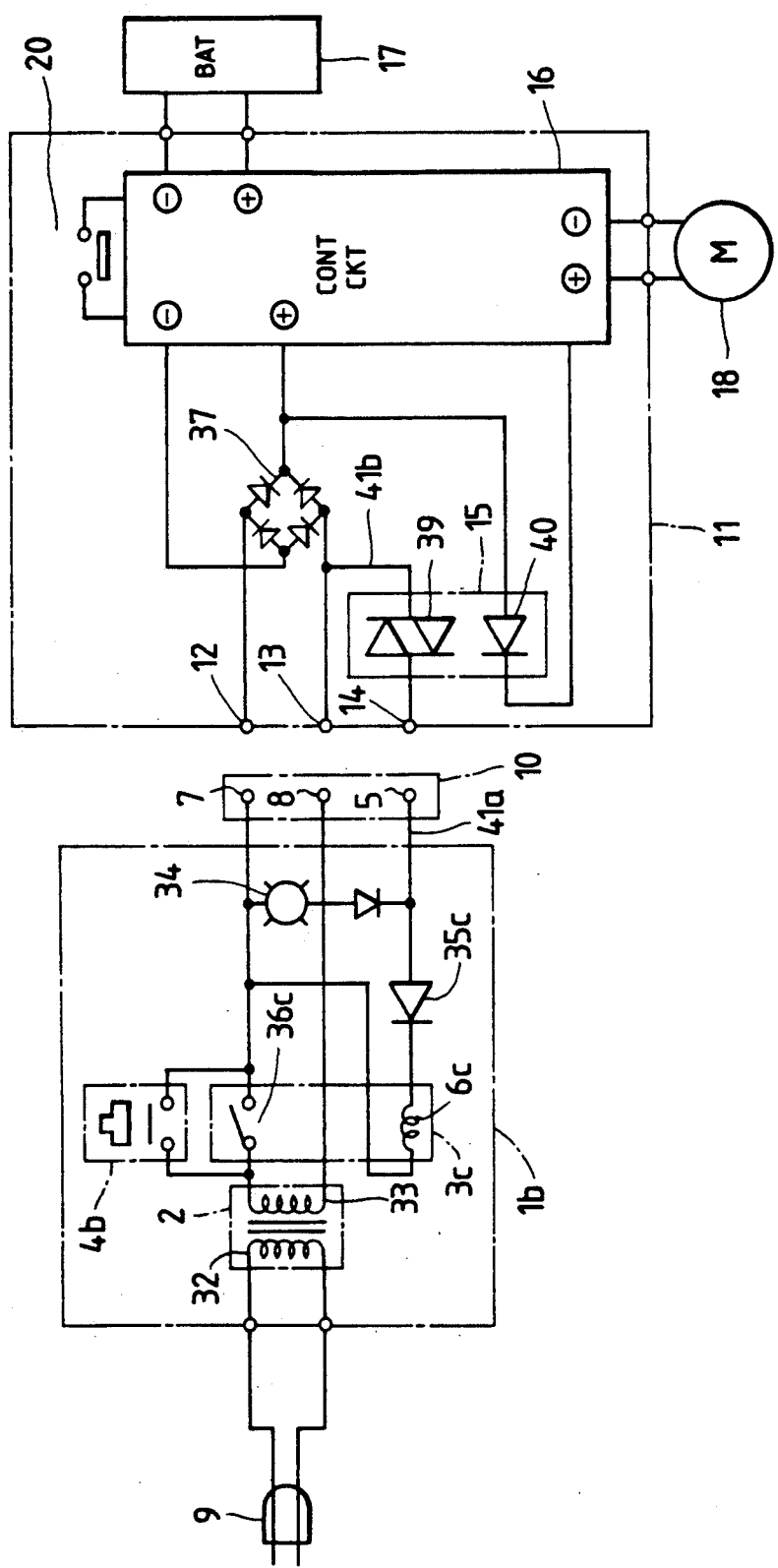
FIG. 6 shows another embodiment of a charging circuit applied to the bubble generating apparatus.

Referring to FIG. 6, the same parts as in FIG. 1 are indicated by the same symbol. In FIG. 6, the primary winding 32 of the transformer 2 is connected directly to the plug. The secondary winding 33 of the transformer 2 is connected to the switch 4b, the contact 36C of the relay 3C and the connecting terminal 8 of the connector 10, respectively. The switch 4b and the contact 36C of the relay 3C are connected to the connecting terminal 7 in common. The coil 6C of the relay 3C and the diode 35C are connected in series between the connecting terminals 5 and 7.

By closing the switch 4b, the coil 6C and the lamp 34 are flowed current. By flowing current to the coil 6C, the contact 36C maintains the closing state. When the battery 17 is charged sufficiently and the photo-triac 15 is ceased to flow current, the coil 6C stops to flow current, the contact 36C is opened and the charging of the battery 17 is finished. As explained above, the power unit 1b works as the power unit 1 disclosed in FIG. 1.

Figure 2:
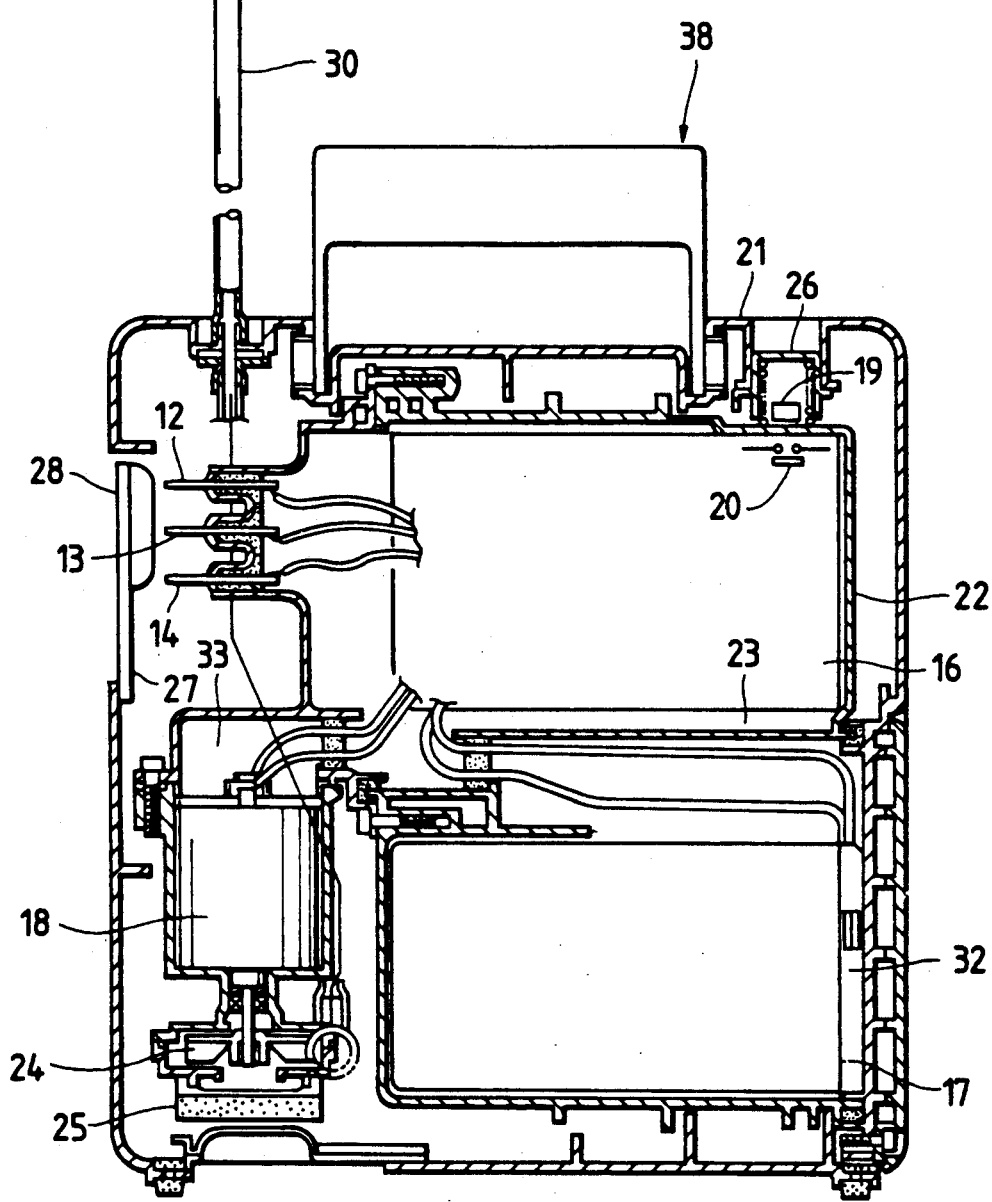
FIG. 2 illustrates a front sectional view of the bubble generating apparatus.

As shown in FIG. 2, the body 38 encloses within the case 21 the main circuit 16, the battery 17, the motor 18, a water sealing case 22 holding the connecting terminals 12, 13 and 14 which face on the aperture 28 of the case 21, an impeller 24 which is connected directly to the motor 18 and rotates with the motor when the motor 18 is conducted current, a pump 25 which suctions air from a suction tube 30 when the impeller 24 rotates and jets water from a nozzle 29 shown in FIG. 3 as a bubble injection water, a switch 26 which has a magnet 19 facing to the lead switch 20 and closes the lead switch by putting the magnet 19 to the switch 26 and opens the lead switch by putting the magnet 19 away from the switch 26, and a slide cover 27 for opening and closing the aperture 28.

The operation of the body 38 is carried out in water. By operating the switch button 26 and controlling the control circuit 16, the motor 18 is rotated and stopped, namely, the bubble water injection is generated and stopped. Even if the contacts 12, 13, or 14 is made wet by water in the case of the body 38 including the charging circuit being submerged, the discharge from the battery 17 and the unnecessary consumption of the battery power can be prevented and the performance of the battery 17 can be maintained, since the current from the battery 17 to the connecting terminals 12, 13 and 14 can be prevented from being flowed reversely.

The connector 10 and the connecting terminals 12, 13, 14 of the present invention do not flow a direct current but flows a alternating current. Accordingly, the present invention can prevent an electric erosion and electromigration caused by an existence of water, and has an effect for maintaining the quality.

By using the contacts of the DC driven relays 3a and 3b shown in FIG. 1 or relay 3C shown in FIG. 6 on the contacts 36a and 36b, or 36c for switching ON and OFF the current from the plug 9, a miniature relay can be used so that the power unit 1 can be made smaller.

Since the switching ON and OFF of the current flowing through the relays 3a, 3b and 3c can be done by the conducting and interrupting of diode portion 40 of the photo-triac 15 which is not connected to the driving circuit of the relays 3a, 3b and 3c, and the diode bridge 37 is provided at the main circuit 1 for preventing the reverse flow of the current from the battery to the connector 10, the currents flowing through the connecting terminals 12, 13 and 14 can be alternating currents.

According to the present invention the following effects can be attained:
1. Since the reverse current from the battery to the connecting terminals of the body is prevented, an unnecessary power consumption of the battery can be prevented and the performance of the battery can be maintained.
2. Since the current flowing through the connecting terminals is an alternating current, an electric erosion and electro-migration of the connecting terminals can be prevented so that the quality of the terminals can be maintained.
3. Since the switching ON and OFF of the electric power source current is carried out by the DC miniature relays, the size of the charging apparatus of the present invention can be made small.
4. Since the signal wires are controlled to conduct or interrupt the instruction signals from the control circuit by the element such a photo-triac in which the alternating current portion and the direct current portion are not connected electrically, the reverse current from the battery through the signal wires can be prevented.

What we claim is:
1. A charging circuit comprising a main circuit for charging a battery, and a power unit connected to an electric power source and said main circuit through a connector and including relay means with relay contact means for supplying and for interrupting current to said main circuit from said electric power source through said connector when said relay means is energized to close said relay contact means by a control means, wherein said main circuit and said power unit have signal wires, respectively, for transmitting a control signal through said connector to said relay means for opening said relay contact means when said main circuit completes charging of said battery, said power unit including an element connected between said battery and a terminal therein connected to said connector for detecting a reverse current from said battery to said terminal and for transmitting said control signal to said relay means through said connector for preventing a flow of reverse current from said battery to said terminal, said power unit further including a parallel circuit comprising a first series circuit of a first diode and a first direct current relay and a second series circuit of a second diode and a second direct current relay connected in antiparallel to said first diode and said first direct current relay, said parallel circuit being connected between said electric power source and said connector, and said relay contact means of said relay means being provided by each contact of said first and second direct current relays.

2. A charging circuit comprising a main circuit for charging a battery, and a power unit connected to an electric power source and said main circuit through a connector and including relay means with relay contact means for supplying and for interrupting current to said main circuit from said electric power source through said connector, wherein said connector comprises three connecting terminals, said power unit comprises a transformer which transforms an electric power source voltage to a voltage which is necessary for charging said battery and connects a secondary winding thereof to first and second connecting terminals of said connector, said relay means including two direct current relays with coils which are connected to said first connecting terminal respectively, two diodes connected in antiparallel respectively between each relay coil and a third connecting terminal of said connector, two normally open contacts of said two direct current relays being connected between said electric power source and the primary winding of the transformer, and a switch which is connected in parallel to said normally open contacts for passing a primary current of the transformer to a secondary winding thereof, and said main circuit comprises a diode bridge connected to said first and second connecting terminals for introducing an alternating current from said transformer, a control circuit for inputting a direct current rectified by said diode bridge, and for supplying the direct current to said battery, and a phototriac having a triac portion connected between said second connecting terminal and said third connecting terminal of said connector and a diode portion connected to a negative terminal of said diode bride and said triac portion based on a control signal from said control circuit when said control circuit finishes charging of said battery.

3. A charging circuit comprising a main circuit for charging a battery, and a power unit connected to an electric power source and said main circuit through a connector and including relay means with relay contact means for supplying and for interrupting current to said main circuit from said electric power source through said connector, said connector comprises three connecting terminals, said power unit comprises a transformer which transforms an electric power source voltage to voltage which is necessary for charging said battery and connects a secondary winding thereof to first and second connecting terminals of said connector, said relay means including a direct current relay with a coil connected to said first connecting terminal, a diode which connects a cathode thereof to said relay coil and an anode thereof to a third connecting terminal of said connector, a normally open contact of said direct current relay being connected between said electric power source and the primary winding of the transformer, and a switch which is connected in parallel to the normally open contact for passing a primary current of the transformer to a secondary winding thereof, said main circuit comprises a diode bridge connected to said first and second winding terminals for introducing an alternating current from said transformer, a control circuit for inputting a direct current rectified by said diode bridge and supplying the direct current to said battery, and a photo-triac having a triac portion connected between said second connecting terminal and said third connecting terminal of said connector and a diode portion connected to a negative terminal of said diode bridge and said control circuit for closing the triac portion based on a control signal from said control circuit when said control circuit finishes charging of said battery.

* * * * *